United States Patent
Cuddy et al.

(10) Patent No.: US 9,714,093 B2
(45) Date of Patent: Jul. 25, 2017

(54) SELF-DAMPENING TIE-ROD

(71) Applicant: THE BOEING COMPANY, Chicago, IL (US)

(72) Inventors: Nathanial Cuddy, Snohomish, WA (US); Harold Erickson, Mukilteo, WA (US); Randy Garcia, Bronx, NY (US); Benjamin Tegge, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 55 days.

(21) Appl. No.: 14/538,947

(22) Filed: Nov. 12, 2014

(65) Prior Publication Data

US 2016/0130002 A1  May 12, 2016

(51) Int. Cl.
| | |
|---|---|
| F16F 9/44 | (2006.01) |
| B64D 11/00 | (2006.01) |
| F16F 9/19 | (2006.01) |
| F16F 13/00 | (2006.01) |
| F16F 9/32 | (2006.01) |
| F16F 9/34 | (2006.01) |
| F16F 9/512 | (2006.01) |
| F16F 9/06 | (2006.01) |

(52) U.S. Cl.
CPC ............ B64D 11/00 (2013.01); F16F 9/062 (2013.01); F16F 9/19 (2013.01); F16F 9/3264 (2013.01); F16F 9/34 (2013.01); F16F 9/512 (2013.01); F16F 13/007 (2013.01); *F16F 2230/0047* (2013.01); *F16F 2236/12* (2013.01); *F16F 2238/04* (2013.01)

(58) Field of Classification Search
CPC .... F16F 1/128; F16F 9/003; F16F 9/43; F16F 9/48; F16F 9/0209; F16F 9/3264; B62D 1/192; F16D 66/02
USPC ......................................... 188/312, 313, 315
See application file for complete search history.

(56) References Cited

U.S. PATENT DOCUMENTS

| | | | | |
|---|---|---|---|---|
| 3,360,086 A | * | 12/1967 | Damske | F16F 9/003 |
| | | | | 188/313 |
| 3,435,700 A | * | 4/1969 | Calhoun | B62D 1/192 |
| | | | | 180/78 |
| 3,840,097 A | * | 10/1974 | Holley | F16F 9/48 |
| | | | | 188/287 |

(Continued)

FOREIGN PATENT DOCUMENTS

| | | |
|---|---|---|
| DE | 102007022629 A1 | 11/2008 |
| EP | 0850833 A2 | 7/1998 |

OTHER PUBLICATIONS

Extended European Search Report for EP Application No. 15 19 2542 dated Apr. 5, 2016.
www.sram.com, Monarch XX SRAM dated Jan. 4, 2016, 2 pgs.

*Primary Examiner* — Christopher Schwartz
(74) *Attorney, Agent, or Firm* — Marshall, Gerstein & Borun LLP

(57) ABSTRACT

A tie rod assembly which includes a first rod member and an enclosure which defines an opening and contains a fluid with the first rod member affixed to the enclosure. A second rod member extends through the opening with a seal member positioned between the second rod member and the enclosure. The assembly also includes a head member affixed to the second rod member wherein the head member is positioned within the enclosure and the head member and the second rod member are moveable relative to the enclosure.

20 Claims, 8 Drawing Sheets

(56) References Cited

U.S. PATENT DOCUMENTS

| | | | | |
|---|---|---|---|---|
| 4,266,639 | A | * | 5/1981 | Schloth .................. F16L 3/217 |
| | | | | 188/313 |
| 4,492,290 | A | | 1/1985 | Zavodny |
| 4,673,063 | A | * | 6/1987 | Engle .................... F16F 9/3264 |
| | | | | 116/272 |
| 4,874,066 | A | * | 10/1989 | Silberstein ............. F16F 9/512 |
| | | | | 137/514.5 |
| 4,989,537 | A | * | 2/1991 | Hutchinson, Sr. ...... F16D 66/02 |
| | | | | 116/208 |
| 5,170,530 | A | * | 12/1992 | Kopec ..................... E05F 3/108 |
| | | | | 16/52 |
| 5,220,706 | A | * | 6/1993 | Bivens ..................... E05F 3/02 |
| | | | | 16/66 |
| 5,351,562 | A | * | 10/1994 | Scott ..................... F16F 9/0209 |
| | | | | 116/205 |
| 5,568,847 | A | | 10/1996 | Guilloud et al. |
| 5,862,895 | A | * | 1/1999 | Ricard ..................... F16F 9/43 |
| | | | | 188/287 |
| 6,644,168 | B1 | | 11/2003 | Browne et al. |
| 7,066,455 | B2 | * | 6/2006 | Adoline ................. F16F 1/128 |
| | | | | 267/168 |
| 2001/0032762 | A1 | * | 10/2001 | Weisgerber ............ B62D 5/001 |
| | | | | 188/266 |
| 2003/0146343 | A1 | | 8/2003 | Zoppitelli et al. |
| 2010/0051401 | A1 | | 3/2010 | Humfeldt et al. |
| 2013/0112517 | A1 | * | 5/2013 | Henige .................. F16F 9/504 |
| | | | | 188/275 |

* cited by examiner

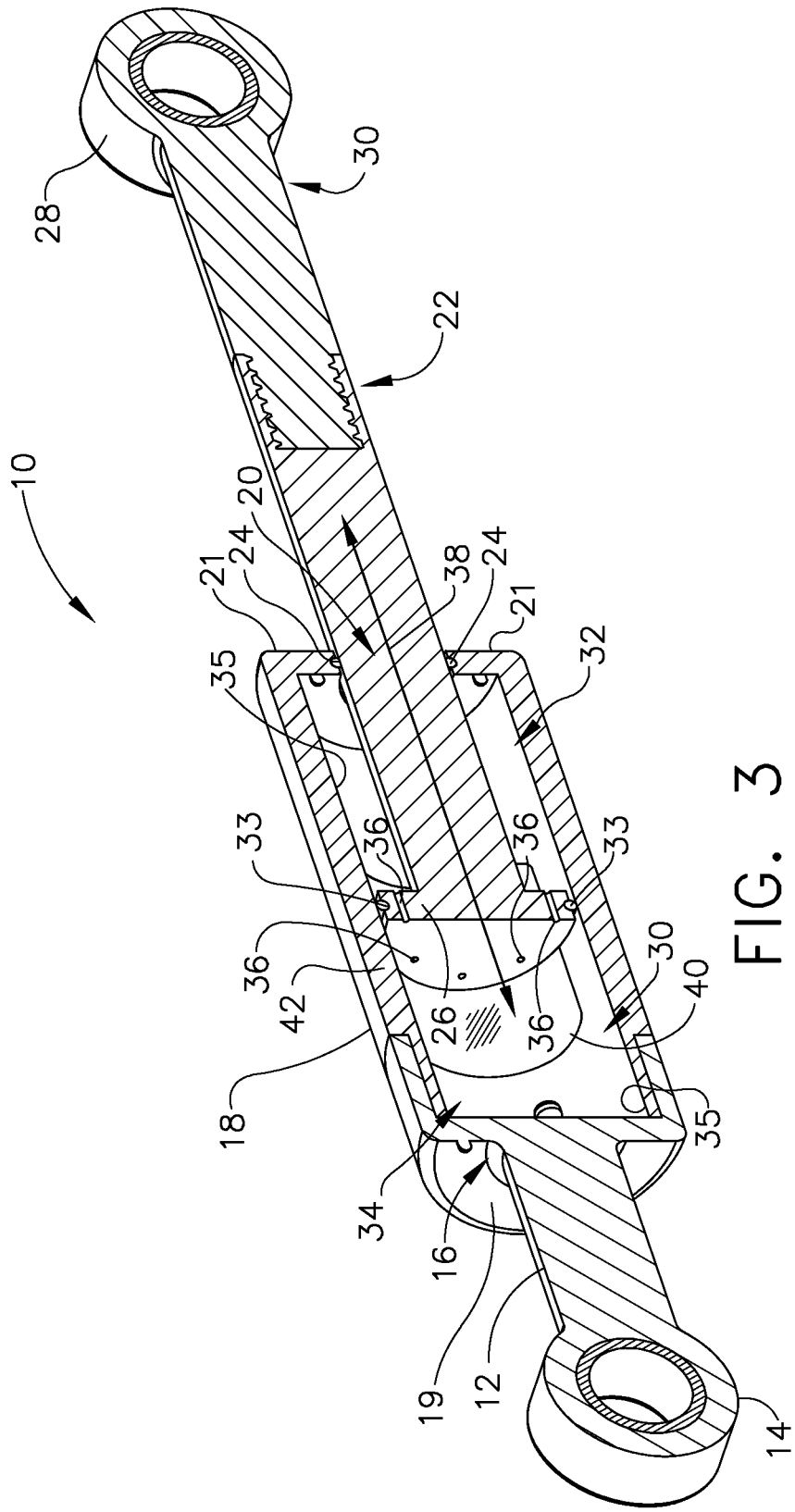

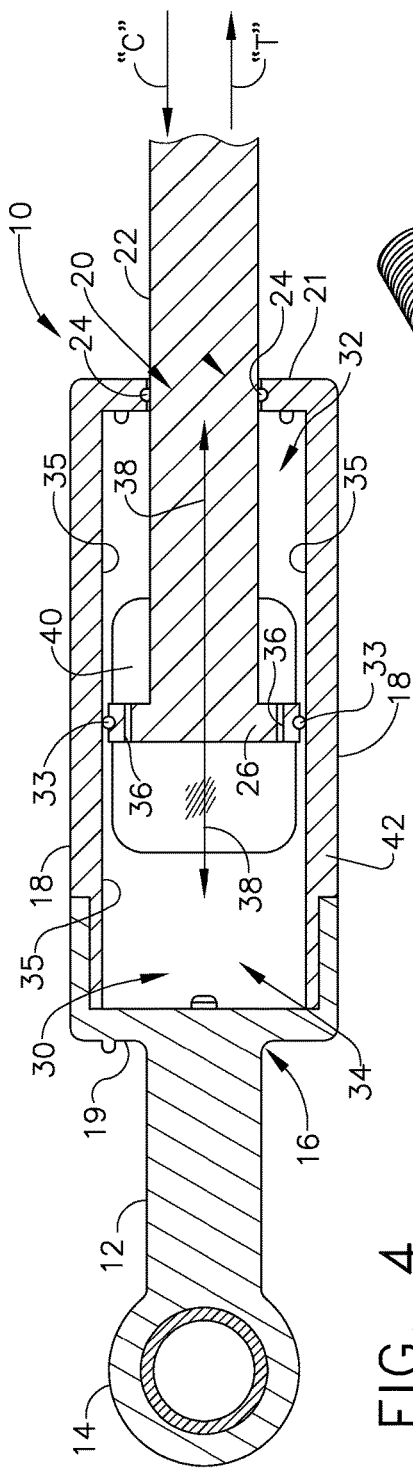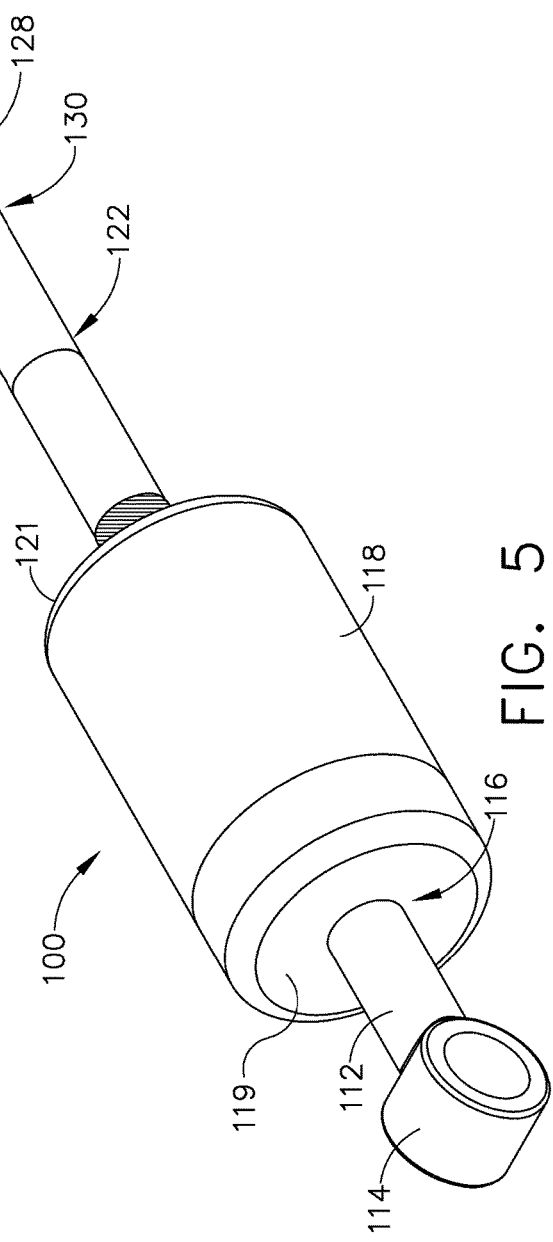

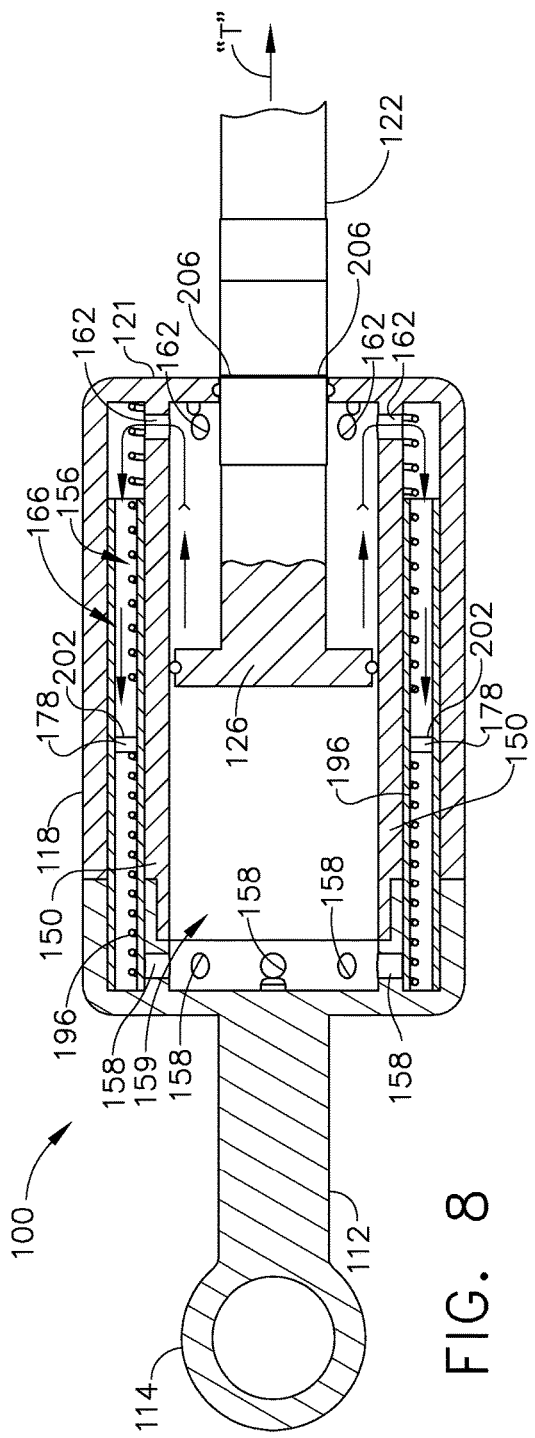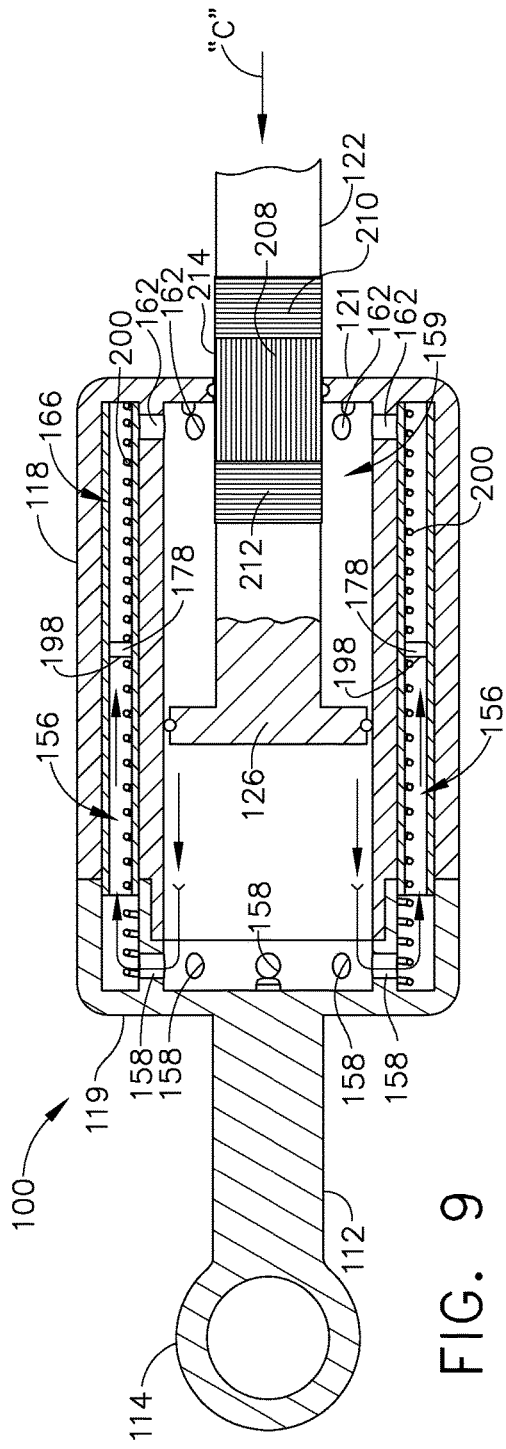

SELF-DAMPENING TIE-ROD

FIELD

This invention relates to a tie rod connector, and more particularly, to a tie rod connector subjected to tensile and compression forces.

BACKGROUND

Tie rods are used to secure cabin interior monuments within an aircraft. There are a number of monuments that are secured within the cabin of the aircraft such as closets, bar units, lowered ceilings, partitions, seat ottomans and the like. Some monuments are affixed to the floor within the cabin and then also affixed to the structure of the aircraft with tie rods. With the flexibility of a fuselage, the fuselage of an in-flight aircraft will experience structural egging and crowning movements. These movements of the fuselage are transmitted as tensile and compression forces through the tie rods to the monument the tie rods secure.

The tensile and compression forces that are received by the monument from the tie rod, during in-flight operations, will cause structural issues such as stress to joints and racking which can also result in functional issues for the monument. For example, tie rods securing a closet within the cabin, will transmit these tensile and compression forces to the closet and create stressed joints and move portions of the closet structure out of alignment. With the closet structure out of alignment, the doors to the closet will bind and will inhibit or prevent the doors from being opened. Thus, there is a need to prevent unwanted loadings onto monuments during in-flight operation of the aircraft.

Even though there is a need to prevent these unwanted operational tensile and compression forces from being transferred to the monuments, there is also a need to provide a rigid secured connection of the monument to the aircraft structure during a severe loading event experienced by the aircraft.

SUMMARY

In an advantageous embodiment of tie rod assembly, the assembly includes a first rod member. An enclosure defines an opening and contains a fluid with the first rod member affixed to the enclosure. A second rod member extends through the opening with a seal member positioned between the second rod member and the enclosure. The assembly further includes a head member affixed to the second rod member with the head member positioned within the enclosure and the head member and the second rod member are moveable relative to the enclosure.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 3 is a cross section view taken along line 3-3 as seen in FIG. 1;

FIG. 4 is a side elevation view the cross section view shown in FIG. 3;

FIG. 5 is a perspective view of a second embodiment of the tie rod assembly;

FIG. 8 is a side elevation view of the cross section view as seen in FIG. 7 with a tensile force exerted onto the tie rod assembly;

FIG. 9 is a side elevation view of the cross section view as seen in FIG. 7 with a compression force exerted onto the tie rod assembly.

DESCRIPTION

Tie rods have been used as connectors for connecting monuments positioned within a cabin of an aircraft to the aircraft structure. The aircraft structure flexes in-flight imparting movement which results in the tie rods transmitting loads onto the monument the tie rod supports. The forces imparted onto the monument, such as a closet, create stressing of joints and impart misalignment and racking of the structure inhibiting or preventing the opening of the door of the monument in-flight. However, tie rod assembly embodiments 10 and 100, as shown in FIGS. 1-4 and FIGS. 5-10, respectively, will prevent the operational loading onto the monument the tie rod assembly supports and will perform as a rigid connection in severe loading events.

Figure 1:
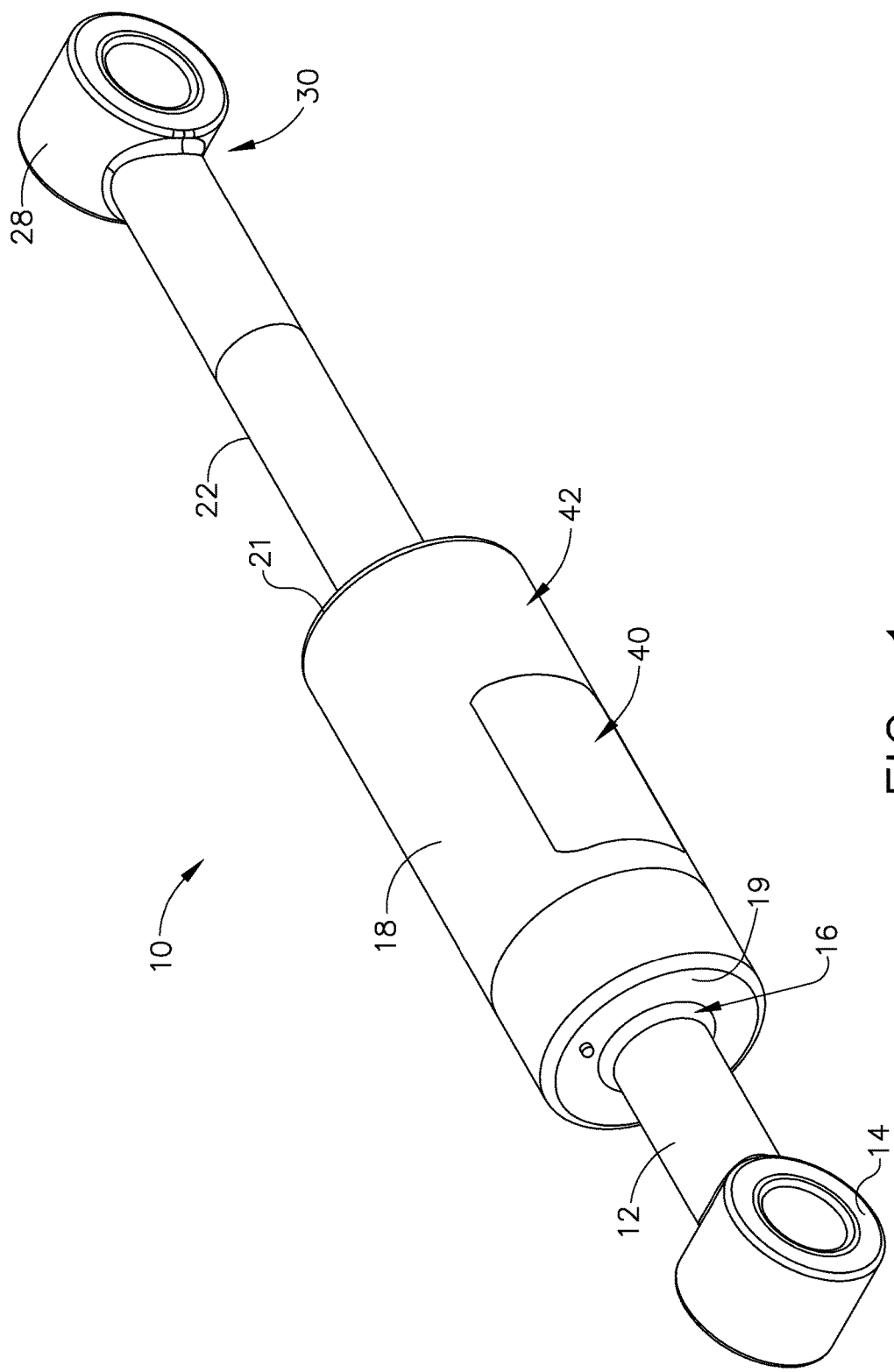
FIG. 1 is a perspective view of a first embodiment of the tie rod assembly.
Figure 2:
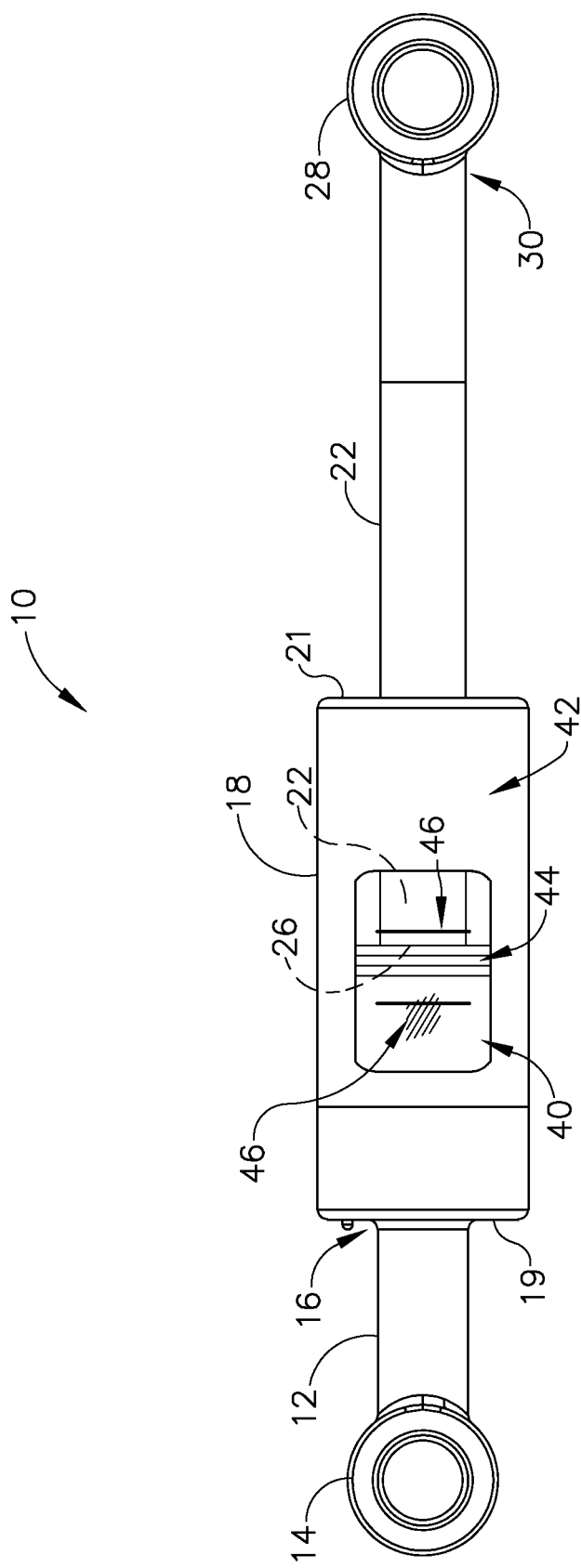
FIG. 2 is a side elevation view of the first embodiment of the tie rod assembly of FIG. 1.

In referring to FIGS. 1-2, tie rod assembly 10 has a first rod member 12 and has a fitting 14 affixed to first rod member 12. First fitting 14 is used for connecting tie rod assembly to one of a monument or to a structure of the aircraft. First fitting 14 can be selected from a variety of connection fittings such as forked, clevis, or a threaded end or the like so as to appropriately attach first rod member 12. First rod member 12 is affixed to enclosure 18 at opposing end 16 of first rod member 12.

Enclosure 18, in this example, is a sealed container that is substantially filled with a fluid such as oil, hydraulic fluid, silicone fluid, or the like, which has a viscosity within the range of ten centipoise (10 cP) to one thousand centipoise (1000 cP). Enclosure 18, in this example, is generally cylindrical in shape and is closed at opposing ends, first end 19 and second end 21, of enclosure 18. Enclosure 18 also defines opening 20, as seen in FIGS. 3 and 4, through which second rod member 22 extends. At least a portion of second rod member 22 is positioned within enclosure 18. Enclosure 18 is sealed such that the fluid contained within enclosure 18 is prevented from exiting enclosure 18 with use of O-ring or seal 24 positioned between second rod member 22 and enclosure 18 at opening 20. This O-ring or seal 24 or the like, such as silicone or the like, in this example, provides resistance from fluid leaking out of enclosure 18 with operational fluid pressures in the range of approximately one hundred pounds per square inch (100 psi) and five thousand pounds per square inch (5000 psi) being exerted onto seal 24. Seal or O-rings can be employed from a wide variety of seals and O-rings to provide the fluid pressure resistance necessary to resist the fluid pressure exerted within enclosure 18 for the particular tie rod assembly 10 in operation.

Head member 26 is positioned within enclosure 18 and is affixed to second rod member 22, as seen in FIGS. 2-4. Second rod member 22 and head member 26 are moveable relative to enclosure 18, as will be discussed in more detail herein. Second rod member 22 has second fitting 28 affixed to end portion 30 of second rod member 22. Fitting 28 is used to connect tie rod assembly 10 to the other of the monument or the structure of the aircraft to which first fitting 14 is connected. Similarly, second fitting 28 can be selected from a variety of connection fittings such as forked, clevis or a threaded end or the like so as to appropriately attach second rod member 22.

Enclosure 18 can be constructed of a material selected from a variety of materials, such as metal or plastic. Similarly, first rod member 12, second rod member 22 and head member 26 can also be constructed of a material selected from a variety of materials such as metal or plastic. The materials for tie rod assembly 10 are selected appropriately for the environment in which assembly 10 will used and the forces assembly 10 will engage.

In referring to FIGS. 3 and 4, head member 26 separates interior 30 of enclosure 18 into a first volume 32 and second volume 34. Head member 26 has O-ring or seal 33 positioned between head member 26 and interior surface 35 of enclosure 18. With using O-ring or seal 33, head member 26 is allowed to move along interior surface 35. O-ring or seal 33 also provide a seal between interior surface 35 and head member 26 not permitting fluid contained within enclosure 18 to move between first volume 32 and second volume 34 by way of flowing between head member 26 and interior surface 35. O-ring or seal 33 can be selected from a variety of O-rings or seals, such as silicone, Teflon, Neoprene or rubber and the like. In this example, O-ring 33 will seal a pressure of fluid in the range of one hundred pounds per square inch (100 psi) to five thousand pounds per square inch (5000 psi). A seal or O-ring 33 can be selected from a variety of seals and O-rings so as to provide the fluid pressure resistance necessary to resist the fluid pressure exerted within enclosure 18 onto O-ring or seal 33 for the particular tie rod assembly 10 in operation.

Opening 36 is defined by head member 26 and extends through head member 26 placing the first volume 32 in fluid communication with second volume 34. As can be seen in FIGS. 3 and 4, a plurality of openings 36 are positioned spaced apart from one another. In this example, openings 36 are positioned with adjacent openings 36 being spaced apart the same distance and are positioned about a longitudinal axis 38 of second rod member 22. This balanced distribution of openings 36 within head member 26 will provide even distribution of flow of fluid within enclosure 18 flowing from first volume 32 to second volume 34 and in the reverse direction from second volume 34 to first volume 32. An imbalance of flow of fluid between first and second volumes 32 and 34 would exert a torque onto head member 26 which would otherwise tend to cause head member 26 to bind against interior surface 35 within enclosure 18.

The operation of tie rod assembly 10 has fittings 14 and 28, in this example, secured to a top of a closet and to an upper structure of the fuselage, respectively. In-flight operation has the structure of the aircraft fuselage experiencing structural egging and crowning movements. This movement will be transferred to tie rod assembly 10 through fitting 28, to second rod member 22 and to head member 26 within enclosure 18. A force received by head member 26 of tie rod assembly 10 through in-flight operations, such as two pounds (2 lbs) is known. A fluid for enclosure 18 is selected with a known viscosity, such as six hundred and thirty centipoise (630 cP), in this example. The minimum radius of openings 36 of head member is calculated to permit the fluid to pass through openings 36 between first and second volumes 32 and 34 with forces such as two pounds (2 lbs) from normal in-flight operations exerted onto tie rod assembly 10. In one example, normal flight operations may include one inch (1 inch) of travel within one second (1 second) of time to be a design criteria for tie rod assembly 10 to permit head member 26 to move through the fluid within enclosure 18 and not transmit forces to first rod member 12 and onto the monument tie rod assembly 10 secures. The calculations for the minimum radius for openings 36 to allow head member head 26 to move through the fluid within enclosure 18 is as follows:

Fluid Viscosity @68° F. ($\mu$)=0.4234 lb/(ft*s)
Force applied (F)=2 lb
Radius of hole (r)=?
Assume Shear Velocity (u/y)=2.17E6
This equation will give us the minimum radius allowed $$r > \sqrt{F/(\mu\pi(u/y))}$$

Derived from F=$\mu$Au/y
Where A=$\pi r^2$
r>$\sqrt{2/(0.4234\pi 2.17E6)}$
r>0.01 inches With a minimum radius of 0.01 inches, for this example, head member 26 will move through the fluid within enclosure 18 during in-flight operations and not transmit forces through first fitting 114 to the monument. However, with an extraordinary large force, outside of normal in-flight operational loadings, being exerted through second rod member 22, head member 26 will not be able to move within enclosure 18. Head member 26 will be arrested from movement, in this example, with a force applied to head member 26 through second rod member 22 of nine g (9 g) within 0.04 seconds of time. Head member 26 will push against the fluid within enclosure 18 and the fluid within enclosure 18 will not be able to pass fast enough through openings 36 with the calculated radius of 0.10 inches, thereby arresting the movement of head member 26. Tie rod assembly 10 under these extraordinary loadings will perform as a conventional tie rod.

Operation of tie rod assembly 10 will similarly function with the application of either a tension or compression force being exerted onto second rod member 22. Thus, for example, should the aircraft structure move in-flight, as seen in FIG. 4, in the direction of the arrow designated as "T", away from enclosure 18, a tensile force would otherwise be transmitted to the monument of a conventional rigid tie rod. However, with tie rod assembly 10, the viscosity of fluid within enclosure 18 flows through openings 36 from first volume 32 to second volume 34 permitting head member 26 to move within enclosure 18 in the direction "T". This movement of head member 26 thereby avoids transmission of a tensile force through first rod member 12 onto the monument to which fitting 14 is connected.

With movement of the aircraft structure in the direction of arrow designated as "C" in FIG. 4, a rigid tie rod would apply a compressive force in the direction of arrow "C" onto the monument to which fitting 14 is connected. However, with tie rod assembly 10, the viscosity of fluid within enclosure 18 flows through openings 36 from second volume 34 to first volume 32 permitting head member 26 to move in the direction "C". The movement of head member 26 in direction of arrow "C" avoids transmission of a compressive force into first tie rod 12 and onto the monument through fitting 14.

In installing tie rod assembly 10, care is taken to properly position head member in a central position within enclosure 18 to avoid head member 26 from bottoming out on first end 19 or second end 21 of enclosure 18. In one example, of installing tie rod assembly 10 to avoid bottoming out of head member 26, a window member 40 is provided as seen in FIGS. 1 and 2. Window member 40 is constructed of a clear or at least translucent and strong material permitting visual access to interior 30 of enclosure 18. Such materials for window member 40 include polycarbonate, glass or acrylic or the like. An indicator 44 is positioned on window member 40, as seen in FIG. 2. in this example, as two spaced apart lines 46 which provide a guide to the installer. The installer will connect and adjust fitting 14 and fitting 28 to the monument closet and to the aircraft structure, respectively, in this example, and position head member 26 between the two spaced apart lines 46. Spaced apart lines 46 indicate head member 26 is positioned with a central portion of enclosure 18.

Spaced apart lines 46 will provide installer an indication of the desired positioning of head member 26. Installing tie rod assembly 10 with head member 26 positioned between lines 46 will assure the installer sufficient space is provided between head member 26 and first end 19 and second end 21 of enclosure 18 to avoid bottoming out of head member 26 onto ends 19 and 21 during in-flight operation.

In referring to FIG. 5, another embodiment of tie rod assembly 100 is shown. Rod assembly 100 has a first rod member 112 and a first fitting 114 affixed to first rod member 112. First fitting 114 is used for connecting tie rod assembly 100 to a monument or to the structure of the aircraft. First fitting 114 can be selected from a variety of connection fittings such as forked, clevis or a threaded end or the like so as to appropriately attach first rod member 112. First rod member 112 on an opposing end 116 to first fitting 114 is affixed to enclosure 118.

Enclosure 118, in this example, is a sealed container that is substantially filled with a fluid such as oil, hydraulic fluid, silicone fluid or the like, which has a viscosity within the range of ten centipoise (10 cP) to one thousand centipoise (1000 cP). Enclosure 118, in this example, is generally cylindrical in shape and is closed at opposing ends, first end 119 and second end 121, of enclosure 118. Enclosure 118 also defines opening 120, as seen in FIGS. 6-9, through which second rod member 122 extends. At least a portion of second rod member 122 is positioned within enclosure 118. Enclosure 118 is sealed such that the fluid contained within enclosure 118 is prevented from exiting enclosure 118 with use of O-ring or seal 124 positioned between second rod member 122 and enclosure 118 at opening 120. This O-ring or seal 124 or the like such as silicone or the like in this example provides resistance from leaking fluid contained within enclosure 118 with pressures in the range of approximately one hundred pounds per square inch (100 psi) and five thousand pounds per square inch (5000 psi) exerted onto seal 124. A seal or O-ring can be selected from a variety of seals and O-rings to provide the fluid pressure resistance necessary to resist the fluid pressure to be exerted within enclosure 118 for the particular tie rod assembly 100 in operation.

Head member 126 is positioned within enclosure 118 and is affixed to second rod member 122. Second rod member 122 and head member 126 are moveable relative to enclosure 118, as will be discussed in more detail herein. As seen in FIG. 5, second rod member 122 has second fitting 128 affixed to end portion 130 of second rod member 122. Second fitting 128 is used to connect tie rod assembly 100 to the other of the monument or the structure of the aircraft to which first fitting 114 is connected. Similarly, second fitting 128 can be selected from a variety of connection fittings such as forked, clevis or a threaded end or the like so as to appropriately attach second rod member 122.

Enclosure 118 can be constructed of a material selected from a variety of materials, such as metal or plastic. Similarly, first rod member 112, second rod member 122 and head member 126 can also be constructed of a material selected from a variety of materials such as metal or plastic. The materials for tie rod assembly 100 are selected appropriately for the environment in which assembly 100 will used and the forces assembly 100 will engage.

Figure 6:
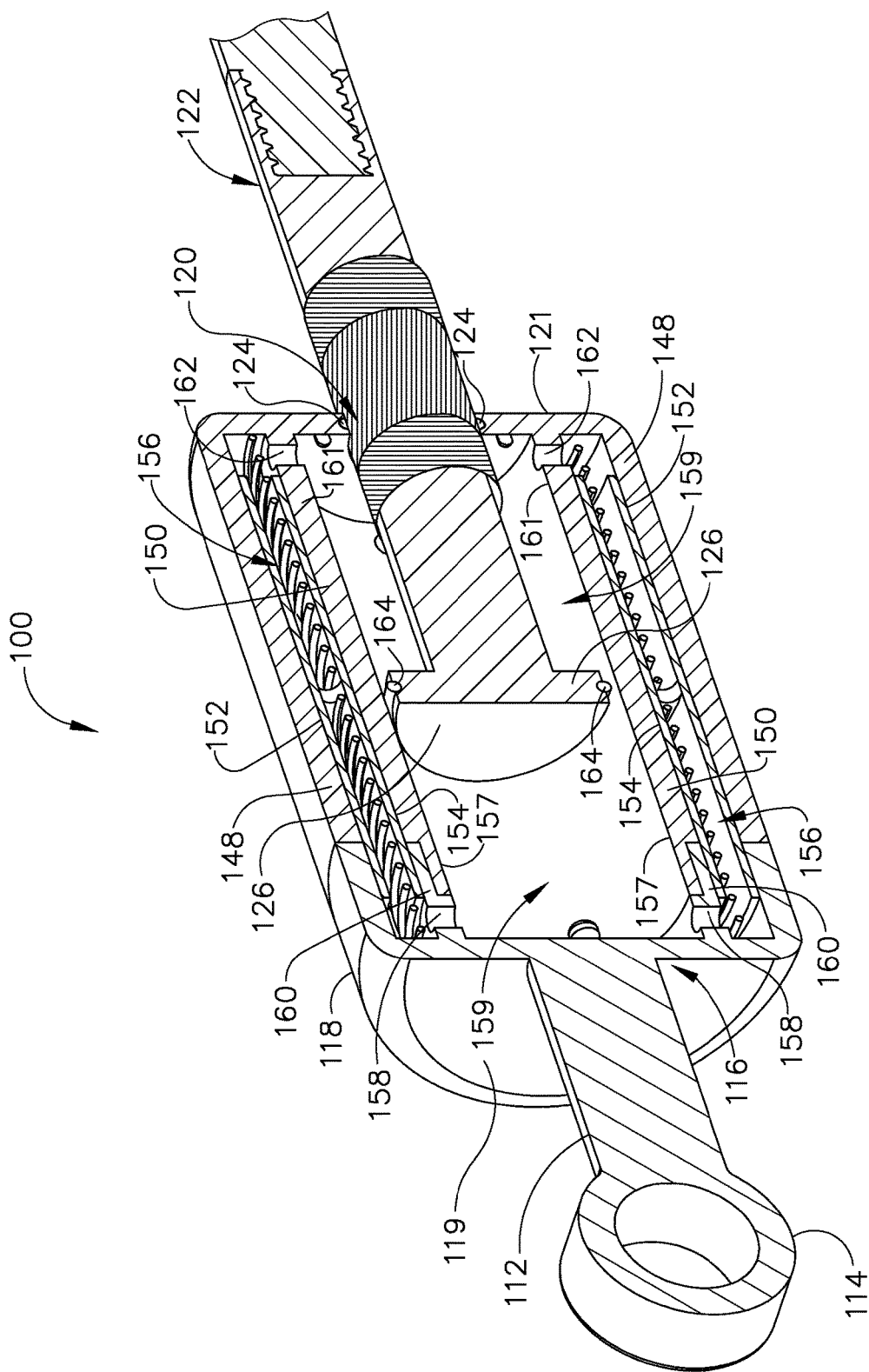
FIG. 6 is a perspective cross section view taken along line 6-6 as seen in FIG. 5.

In referring to FIG. 6, enclosure 118 includes, in this embodiment, first sidewall 148 connected to first end wall 119 and second end wall 121. In this example, first sidewall 148 of enclosure 118 is constructed of a cylindrical shape. Second sidewall 150 is positioned spaced apart from inner surface 152 of first sidewall 148. Second sidewall 150, in this example, is also cylindrical in shape and is positioned concentrically within first sidewall 148. As can be seen in this example, second sidewall 150 includes portion 160 which extends from first end wall 119. First sidewall 148 connects to and extends between first end wall 119 and second end wall 121.

Figure 7:
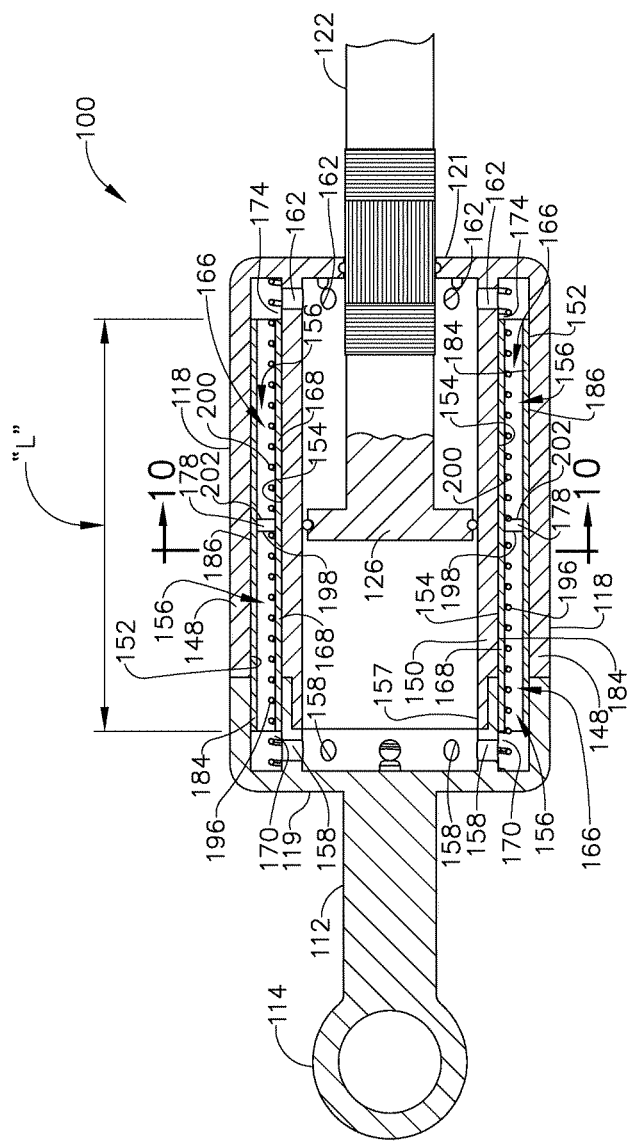
FIG. 7 is a side elevation view of the cross section view as seen in FIG. 6.

Outer surface 154 of second sidewall 150, inner surface 152 of first sidewall 148, first end wall 119 and second end wall 121 define an outer chamber 156 within the enclosure 118. Inner surface 157 of the second sidewall 150, the first end wall 119 and second end wall 121 define inner chamber 159 within the enclosure 118. First opening 158 is defined in first end portion 160 positioned closer to first end wall 119 than to second end wall 121. In this embodiment, first openings 158 are positioned equally spaced apart about cylindrically shaped second sidewall 150, as seen in FIG. 7. Second opening 162 is defined in second portion 161 of second sidewall 150 positioned closer to second end wall 121 than to first end wall 119. Similarly, in this embodiment, second openings 162 are positioned equally spaced apart about cylindrically shaped second sidewall 150, as seen in FIG. 7.

Inner chamber 159 is in fluid communication with outer chamber 156 through first opening 158. Inner chamber 159 is also in fluid communication with outer chamber 156 through second opening 162. Head member 126 is positioned within inner chamber 159 between first and second openings, 158 and 162. Head member 126 has an O-ring or seal 164 positioned between head member 126 and interior surface 157 of second sidewall 150 of enclosure 118. This sealing arrangement utilizing O-ring 164 allows head member 126 to move along interior surface 157 and provide a seal between interior surface 157 and head member 126. This sealing arrangement does not permit fluid contained within enclosure 118 to move between head member 126 and inner surface 157 of second sidewall 150. O-ring or seal 164 can be selected from a variety of O-rings or seals, such as silicone, Teflon, Neoprene or rubber and the like. In this example, O-ring 164 will seal a pressure of fluid in the range of one hundred pounds per square inch (100 psi) to five thousand pounds per square inch (5000 psi). Seals or O-rings can be selected to provide the fluid pressure resistance necessary to resist the fluid pressure exerted within enclosure 118 onto O-ring or seal 164 for the particular tie rod assembly 100 in operation.

In referring to FIG. 7, controller 166 is positioned within outer chamber 156. Controller 166 includes first hollow body 168 which defines first opening 170 which is defined between first end wall 119 and first hollow body 168. First hollow body 168 defines a second opening 174 which is defined between second end wall 121 and first hollow body 168. First hollow body 168 extends along and overlies outer surface 154 of second sidewall 150 and in this embodiment, is cylindrical in shape. Length "L" of first hollow body 168 extends between first opening 158 and second opening 162.

Wall member 178 is connected to first hollow body 168 and is centrally positioned along the length "L" of first hollow body 168 and extends in a direction toward first sidewall 148 of the enclosure 118. Second hollow body 184 in this embodiment, is cylindrical in shape. Second hollow body 184 is positioned spaced apart from and extends about first hollow body 168 and is connected to wall member 178. Outer surface 186 of second hollow body 184 is positioned adjacent to inner surface 152 of first sidewall 148 of enclosure 118.

First spring member 196 is positioned within outer chamber 156 between first side 198 of the wall member 178 and first end wall 119 of the enclosure 118. Second spring member 200 is positioned within outer chamber 156 between second side 202 of wall member 178 and second end wall 121 of the enclosure 118.

Figure 10:
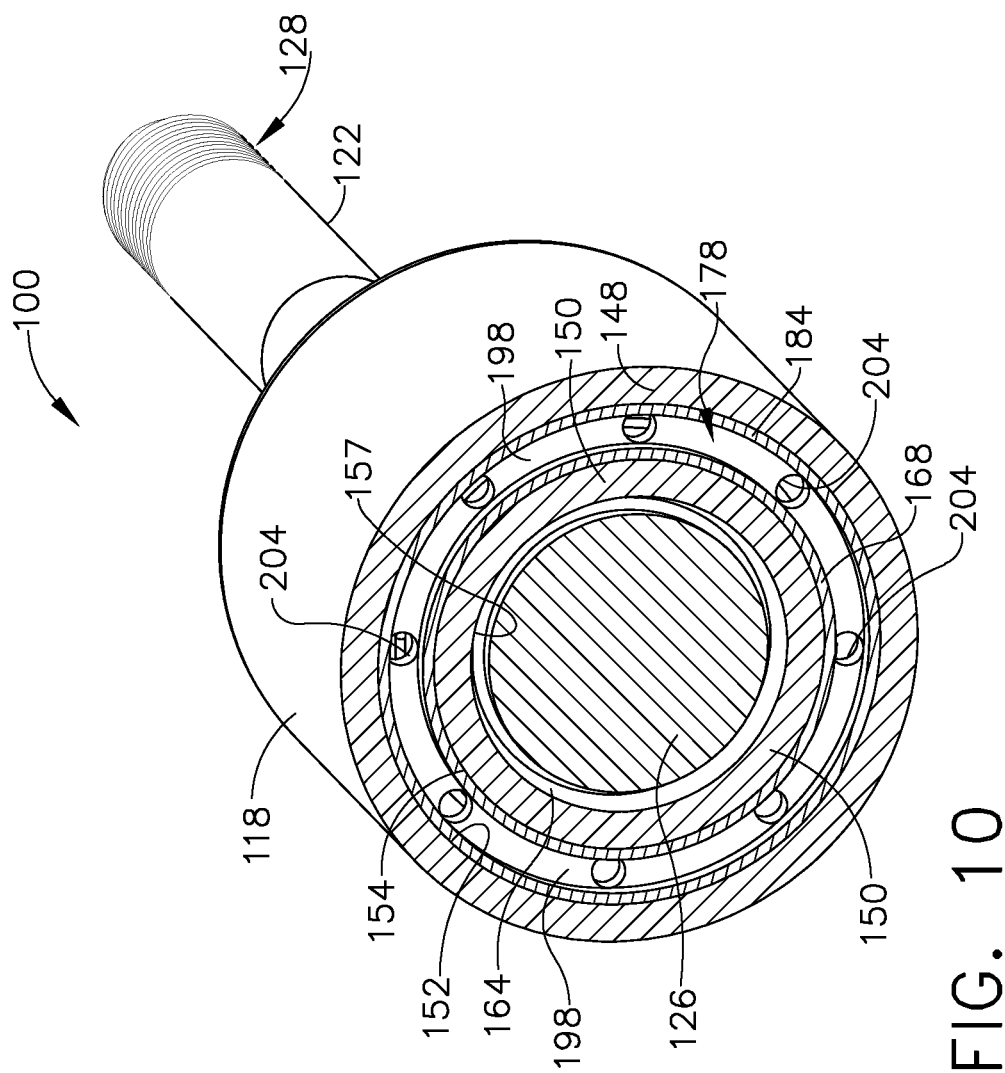
FIG. 10 is a full cross section view taken along line 10-10 of FIG. 7.

In referring to FIG. 10, wall member 178 defines a plurality of spaced apart openings 204. Openings 204 are positioned equally spaced apart in this embodiment placing outer chamber 156 positioned on first side 198 of the wall member 178 into fluid communication with outer chamber 156 which is positioned on second side 202 of the wall member 178, as seen in FIG. 7. Size of the radius of openings 204 are calculated as described earlier for openings 36 with knowing the forces for which head member 126 is to move within enclosure 118 during in-flight operational forces being exerted onto tie rod assembly 100 and the viscosity of fluid contained within enclosure 118. Thus, as operational in-flight movements take place, head member 126 will move within enclosure 118 with fluid contained within enclosure 118 passing through openings 204 and not transmit a compression or tension force to fitting 114 and onto the monument to which it is secured.

In this example, during in-flight operations a tensile force is placed on second rod member 122 in a direction away from tie rod assembly 100 and first fitting 114, as seen in FIG. 8. A compression force placed on second rod member 122 is in a direction toward tie rod assembly 100 and first fitting 114, as seen in FIG. 9. In this example, the movements caused by operation in-flight movements of the aircraft structure exert a force onto head member 126. In turn, head member 126 exerts a force onto the fluid contained within enclosure 118. With openings 204 of wall member 178 designed with the proper radius, the fluid will pass through openings 204 of wall member 178 in outer chamber 156 thereby not transmitting a tensile or compression force through first fitting 114 and onto the monument to which it is connected.

In referring to FIG. 8, when a force is applied to head member 126 in a direction of the arrow designate "T", away from enclosure 118, with second rod member 122 exerting a force greater than nine (9) g within 0.04 seconds of time, head member 126 will push the fluid within enclosure 118 in the direction of the arrows directed toward second end wall 121. The fluid will move into outer chamber 156 through second openings 162. The fluid within outer chamber 156 will not be able to pass through openings 204 of wall member 178, shown in FIG. 10, quickly enough based on the force exerted, the viscosity of the fluid and the radius or size of openings 204 as designed. As a result, the fluid will push against second side 202 of wall member 178 moving controller 166 in the direction toward first opening 158 of second sidewall 150. Wall member 178 pushes against first spring 196 compressing first spring 196. Controller 166, based on the extraordinary force, overcomes the resistant force of first spring 196 and first hollow body 168 blocks or closes first openings 158 of second sidewall 150. Closing first openings 158 of second sidewall 150 stops flow of fluid from outer chamber 156 through first opening 158 into inner chamber 159. At this point, tie rod assembly 100 is fixed and performs as a conventional tie rod.

Should the force in FIG. 8 have been an operational in-flight force exerted in a away from enclosure 118, the fluid within enclosure 118 would move in the direction of the arrows and passed through second opening 162 into outer chamber 156. The fluid would then pass through openings 204 of wall member 178 with first spring 196 providing resistance on any force exerted second side 202 on wall member 178 based on the movement of the fluid within outer chamber 156. As a result, the force generated by the movement of the structure of the aircraft will not reach the monument secured to first fitting 114.

In referring to FIG. 9, when a force is applied to head member 126 in a direction of the arrow designate "C" toward enclosure 118, with second rod member 122 exerting a force greater than one (1) g within 0.04 seconds of time, head member 126 will push the fluid within enclosure 118 in the direction of the arrows toward first end wall 119. The fluid moves in the direction of the arrows into outer chamber 156 through first openings 158. The fluid within outer chamber 156 will not be able to pass through openings 204, as shown in FIG. 10, quickly enough based on the force exerted and based on the radius or size of openings 204 as designed. As a result, the fluid will push against first side 198 of wall member 178 moving controller 166 in the direction toward second openings 162 of second sidewall 150. Wall member 178 pushes against second spring 200 compressing second spring 200. First hollow member body 168 of controller 166, based on the extraordinary force, overcomes the resistant force of second spring 200 and blocks or closes second openings 162 of second sidewall 150. Closing second openings 162 of second sidewall 150 stops flow of fluid from outer chamber 156 through second opening 162 into inner chamber 159. At this point, tie rod assembly 100 is fixed and performs as a conventional tie rod.

Should the force in FIG. 9 have been an operational in-flight force exerted in a direction toward enclosure 118, the fluid within enclosure 118 moves in the direction of the arrows toward first end wall 119 and pass through first openings 158 into outer chamber 156. The fluid would then pass through openings 204 with second spring 200 providing resistance on any force exerted on first side 198 of wall member 178 based on the movement of the fluid within outer chamber 156. As a result, the in-flight force generated by the movement of the structure of the aircraft will not reach the monument secured to fitting 114.

In installing this embodiment of tie rod assembly 100, second rod member 122 includes visual indicators for properly positioning head member 126 in a central position within enclosure 118. With central positioning of head member 126 within enclosure 118, forces exerted on tie rod assembly 100 will not cause head member 126 to bottom out with respect to end walls 119 and 121 within enclosure 118. In FIG. 8, mark or notch 206 is shown positioned on second rod member 122. In FIG. 9, alternatively, second rod member 122 includes three successive portions 210, 208 and 212 of surface 214. Portions 210 and 212 which are separated by portion 208. Portions 210 and 212 are the same color that is different from the color for portion 208. At the time of installation of tie rod assembly 100, the installer will secure first fitting 114 and second fitting 128 to the monument and the structure of the aircraft. In one instance, in FIG. 8, mark or notch 206 will be positioned near end wall 121 indicating head member 126 is centrally positioned within enclosure 118. In the other example, a central portion central portion 208 will be positioned near end wall 121 indicating head member 126 is centrally positioned within enclosure 118.

While various embodiments have been described above, this disclosure is not intended to be limited thereto. Variations can be made to the disclosed embodiments that are still within the scope of the appended claims.

What is claimed:

1. A tie rod assembly, comprising:
   a first rod member;
   an enclosure defines an opening and contains a fluid with the first rod member affixed to the enclosure;
   a second rod member extends through the opening with a seal member positioned between the second rod member and the enclosure; and
   a head member affixed to the second rod member, wherein:
   the head member is positioned within the enclosure such that the head separates the enclosure into a first volume and a second volume;
   the head defines a plurality of unrestricted openings, wherein:
      each of the plurality of unrestricted openings extend through the head member between the first volume and the second volume providing unrestricted flow to and from the first volume and the second volume;
      the plurality of unrestricted openings are positioned spaced apart about a longitudinal axis of the second rod member; and
      adjacent openings of the plurality of unrestricted openings are spaced apart the same distance; and
   the head member and the second rod member are moveable relative to the enclosure.

2. The tie rod assembly of claim 1, wherein the enclosure further includes a window member secured to a sidewall of the enclosure permitting visual access to an interior of the enclosure.

3. The tie rod assembly of claim 2 an indicator is positioned on the window member.

4. The tie rod assembly of claim 1, the diameter of each of the plurality of unrestricted openings is within a range of 0.01 in. to 1 in.

5. The tie rod assembly of claim 1, wherein the fluid substantially fills the enclosure.

6. The tie rod assembly of claim 1, wherein the fluid comprises one of oil, hydraulic fluid, or silicone fluid or the like.

7. The tie rod assembly of claim 1, wherein the fluid has a range of viscosity of 10 cP to 1000 cP.

8. The tie rod assembly of claim 1 wherein the second rod member includes one of indicator marks positioned on a portion of the second rod member and adjacent portions of a surface of the second rod member comprising different colors.

9. The tie rod assembly of claim 1, further includes a seal positioned between the head member and an interior surface of the enclosure.

10. A tie rod assembly, comprising:
    a first rod member;
    an enclosure defines and opening and contains a fluid with the first rod affixed to the enclosure;
    a second rod member extends through the opening with a seal member positioned between the second rod member and the enclosure; and
    a head member affixed to the second rod member, wherein the head member and the second rod member are moveable relative to the enclosure, wherein:
    the enclosure further comprises an outer chamber comprising a first sidewall and a second sidewall;
    the outer chamber surrounds an inner chamber; and
    the head member is positioned within the inner chamber and the inner chamber is in fluid communication with the outer chamber through a first and second openings defined by the second sidewall; and
    a controller positioned within the outer chamber, comprising:
       a first hollow body which overlies the second sidewall and has a length that extends between the first and second openings;
       a wall member connected to first hollow body and extends in a direction toward the first sidewall; and
       a second hollow body positioned spaced apart from the first hollow body and connected to the wall member; wherein:
       with movement of the head member in one direction fluid within the inner chamber flows through the first opening and exerts a force onto the first side of the wall member moving the controller in a direction toward the second opening; and
       with movement of the head member in a second direction, fluid within the inner chamber flows through the second opening and exerts a force on the second side of the wall member moving the controller in a direction toward the first opening.

11. The tie rod assembly of claim 10, wherein the enclosure is constructed cylindrical in shape.

12. The tie rod assembly of claim 11, wherein the second sidewall is constructed cylindrical in shape and is concentric with the enclosure.

13. The tie rod assembly of claim 10, wherein the first opening is positioned closer to a first end wall than a second end wall of the enclosure; and the second opening is positioned closer to the second end wall than the first end wall of the enclosure.

14. The tie rod assembly of claim 10, wherein the first hollow body of the controller and the second hollow body of the controller are constructed cylindrical in shape.

15. The tie rod assembly of claim 10, wherein:
    a first portion of the second sidewall defines at least two spaced apart first openings; and
    a second portion of the second sidewall defines at least two spaced apart second openings.

16. The tie rod assembly of claim 10, further includes a first spring positioned within the outer chamber positioned on a first side of the wall member and a second spring positioned within the outer chamber positioned on a second side of the wall member.

17. The tie rod assembly of claim 10, wherein:
    with a force of greater than one g applied to the second rod member in a direction away from the enclosure, the controller moves to a blocking position with respect to the first opening; and
    with a force of greater than one g applied to the second rod member in a direction toward the enclosure, the controller moves in a blocking position with respect to the second opening.

18. The tie rod assembly of claim 10, wherein the wall member defines a plurality of spaced apart openings placing outer chamber positioned on a first side of the wall member in fluid communication with the outer chamber positioned on a second side of the wall member.

19. The tie rod assembly of claim 18, wherein the plurality of spaced apart openings are equally spaced apart.

20. The tie rod assembly of claim 10, further includes a seal positioned between the head member and an interior surface of a second sidewall of the inner chamber.

* * * * *

UNITED STATES PATENT AND TRADEMARK OFFICE
CERTIFICATE OF CORRECTION

PATENT NO. : 9,714,093 B2
APPLICATION NO. : 14/538947
DATED : July 25, 2017
INVENTOR(S) : Nathanial Cuddy et al.

It is certified that error appears in the above-identified patent and that said Letters Patent is hereby corrected as shown below:

In the Claims

At Column 9, Line 66, "and opening" should be -- an opening --.

Signed and Sealed this
Sixteenth Day of January, 2018

Joseph Matal
*Performing the Functions and Duties of the
Under Secretary of Commerce for Intellectual Property and
Director of the United States Patent and Trademark Office*